United States Patent
Toujinbara et al.

(10) Patent No.: US 10,574,058 B2
(45) Date of Patent: Feb. 25, 2020

(54) POWER CONVERSION APPARATUS, POWER GENERATION SYSTEM, CONTROLLER, AND METHOD FOR PERFORMING CONTROL

(71) Applicant: Kabushiki Kaisha Yaskawa Denki, Kitakyushu-shi (JP)

(72) Inventors: Hirotaka Toujinbara, Kitakyushu (JP); Takashi Kuboyama, Kitakyushu (JP); Daishi Ueno, Kitakyushu (JP)

(73) Assignee: Kabushiki Kaisha Yaskawa Denki, Kitakyushu-shi (JP)

( * ) Notice: Subject to any disclaimer, the term of this patent is extended or adjusted under 35 U.S.C. 154(b) by 242 days.

(21) Appl. No.: 15/334,878

(22) Filed: Oct. 26, 2016

(65) Prior Publication Data

US 2017/0047743 A1 Feb. 16, 2017

Related U.S. Application Data

(63) Continuation of application No. PCT/JP2014/064532, filed on May 30, 2014.

(51) Int. Cl.
| | |
|---|---|
| *H02J 3/38* | (2006.01) |
| *H02M 3/157* | (2006.01) |
| *H02M 7/5387* | (2007.01) |

(52) U.S. Cl.
CPC ............. *H02J 3/385* (2013.01); *H02M 3/157* (2013.01); *H02M 7/53873* (2013.01); *Y02E 10/58* (2013.01)

(58) Field of Classification Search
CPC .. H02J 3/385; G05F 1/66; G05F 1/67; H02M 3/157; H02M 7/53873; H02M 2001/007; Y02E 10/58
See application file for complete search history.

(56) References Cited

U.S. PATENT DOCUMENTS

| | | | |
|---|---|---|---|
| 5,682,305 A | | 10/1997 | Kurokami et al. |
| 5,892,354 A | * | 4/1999 | Nagao ................. G05F 1/67 323/299 |

(Continued)

FOREIGN PATENT DOCUMENTS

| | | |
|---|---|---|
| JP | 07-191767 A | 7/1995 |
| JP | 10-301646 A | 11/1998 |

(Continued)

OTHER PUBLICATIONS

International Search Report dated Aug. 12, 2014 in PCT/JP2014/064532 filed May 30, 2014 (with English Translation).

(Continued)

*Primary Examiner* — Gary L Laxton
*Assistant Examiner* — Ivan Laboy
(74) *Attorney, Agent, or Firm* — Oblon, McClelland, Maier & Neustadt, L.L.P.

(57) ABSTRACT

A power conversion apparatus includes a power converter, a target command controller, a feedback controller, and a gain adjustor. The power converter is configured to convert first power supplied from a power generation source into second power. The target command controller is configured to increase or decrease a target command so as to cause the first power to follow maximum suppliable power of the power generation source. The feedback controller is configured to control the power converter by feedback control that is based on a deviation between the target command and at least one of a supplied voltage and a supplied current supplied from the power generation source to the power converter. The gain adjustor is configured to adjust a gain of the feedback control based on at least one of the supplied voltage, the supplied current, and the target command.

18 Claims, 12 Drawing Sheets

(56) References Cited

U.S. PATENT DOCUMENTS

| | | | | |
|---|---|---|---|---|
| 5,923,158 | A | * 7/1999 | Kurokami | G05F 1/67 323/299 |
| 2002/0163323 | A1 | * 11/2002 | Kasai | G05F 1/67 323/284 |
| 2009/0115393 | A1 | 5/2009 | Yoshida et al. | |
| 2010/0156186 | A1 | * 6/2010 | Kim | H01M 16/003 307/72 |
| 2011/0242857 | A1 | * 10/2011 | Kim | H02J 3/385 363/21.1 |
| 2012/0161513 | A1 | * 6/2012 | Ohshima | H02M 7/1626 307/11 |
| 2015/0092462 | A1 | * 4/2015 | Ohori | H02M 7/44 363/71 |

FOREIGN PATENT DOCUMENTS

| | | |
|---|---|---|
| JP | 2000-069671 A | 3/2000 |
| JP | 2002-271995 A | 9/2002 |
| JP | 2009-117658 A | 5/2009 |
| JP | 2014-016690 A | 1/2014 |

OTHER PUBLICATIONS

Written Opinion dated Aug. 12, 2014 in PCT/JP2014/064532 filed May 30, 2014.
Office Action dated Nov. 22, 2016 in Japanese Patent Application No. 2016-523084 (with English translation).

* cited by examiner

POWER CONVERSION APPARATUS, POWER GENERATION SYSTEM, CONTROLLER, AND METHOD FOR PERFORMING CONTROL

CROSS-REFERENCE TO RELATED APPLICATIONS

The present application is a continuation application of International Application No. PCT/JP2014/064532, filed May 30, 2014. The contents of this application are incorporated herein by reference in their entirety.

BACKGROUND

Field of the Invention

The embodiments disclosed herein relate to a power conversion apparatus, a power generation system, a controller, and a method for performing control.

Discussion of the Background

Japanese Unexamined Patent Application Publication No. 2014-16690 discloses a power generation system that includes a power conversion apparatus to convert power supplied from a power generation source such as a solar cell into a predetermined kind of power. This kind of power conversion apparatus typically has a function referred to as maximum power point tracking control. The maximum power point tracking control is to control a power converter of the power conversion apparatus to maximize the power output of the power generation source based on current and voltage supplied to the power converter from the power generation source.

SUMMARY

According to one aspect of the present disclosure, a power conversion apparatus includes a power converter, a target command controller, a feedback controller, and a gain adjustor. The power converter is configured to convert first power supplied from a power generation source into second power. The target command controller is configured to increase or decrease a target command so as to cause the first power to follow maximum suppliable power of the power generation source. The feedback controller is configured to control the power converter by feedback control that is based on a deviation between the target command and at least one of a supplied voltage and a supplied current supplied from the power generation source to the power converter. The gain adjustor is configured to adjust a gain of the feedback control based on at least one of the supplied voltage, the supplied current, and the target command.

According to another aspect of the present disclosure, a power generation system includes a power generation source and a power conversion apparatus. The power conversion apparatus includes a power converter, a target command controller, a feedback controller, and a gain adjustor. The power converter is configured to convert first power supplied from the power generation source into second power. The target command controller is configured to increase or decrease a target command so as to cause the first power to follow maximum suppliable power of the power generation source. The feedback controller is configured to control the power converter by feedback control that is based on a deviation between the target command and at least one of a supplied voltage and a supplied current supplied from the power generation source to the power converter. The gain adjustor is configured to adjust a gain of the feedback control based on at least one of the supplied voltage, the supplied current, and the target command.

According to another aspect of the present disclosure, a controller includes a target command controller, a feedback controller, and a gain adjustor. The target command controller is configured to increase or decrease a target command so as to cause power supplied from a power generation source to a power converter to follow maximum suppliable power of the power generation source. The feedback controller is configured to control the power converter by feedback control that is based on a deviation between the target command and at least one of a supplied voltage and a supplied current supplied from the power generation source to the power converter. The gain adjustor is configured to adjust a gain of the feedback control based on at least one of the supplied voltage, the supplied current, and the target command.

According to the other aspect of the present disclosure, a method for performing control includes increasing or decreasing a target command so as to cause power supplied from a power generation source to a power converter to follow maximum suppliable power of the power generation source. The power converter is controlled by feedback control that is based on a deviation between the target command and at least one of a supplied voltage and a supplied current supplied from the power generation source to the power converter. A gain of the feedback control is adjusted based on at least one of the supplied voltage, the supplied current, and the target command.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1A:
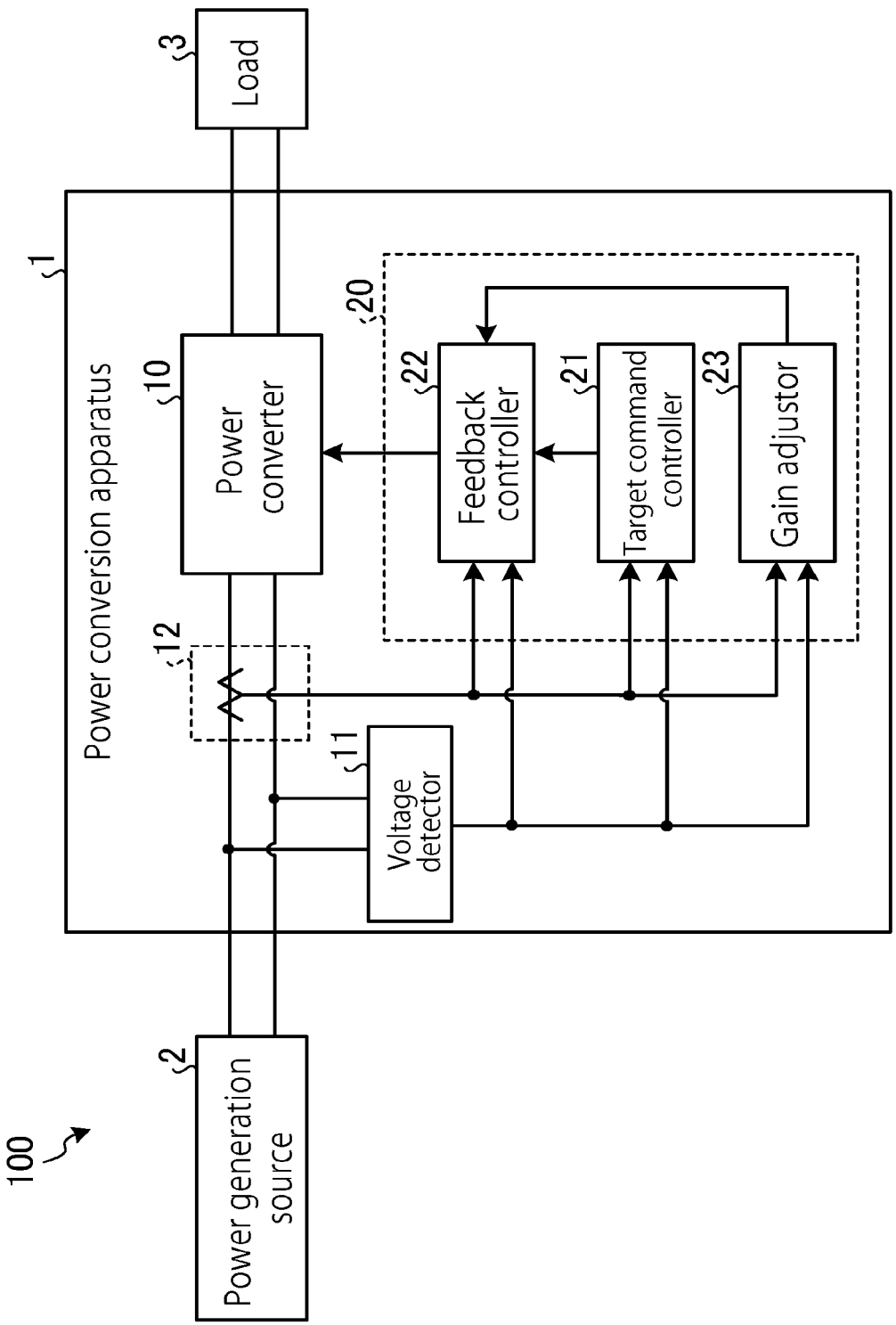
FIG. 1A is a diagram illustrating an exemplary configuration of a power generation system according to an embodiment.

The embodiments will now be described with reference to the accompanying drawings, wherein like reference numerals designate corresponding or identical elements throughout the various drawings. It is noted that the following embodiments are provided for exemplary purposes only and are not intended for limiting purposes.

1. Power Generation System

FIG. 1A is a diagram illustrating an exemplary configuration of a power generation system 100 according to this embodiment. As illustrated in FIG. 1A, the power generation system 100 includes a power conversion apparatus 1 and a power generation source 2. The power conversion apparatus 1 converts DC (direct-current) power generated at the power generation source 2 into AC (alternating-current) power, and outputs the AC power to a load 3. Examples of the power generation source 2 include, but are not limited to, a solar cell, a direct-current electric generator, and a fuel cell. Examples of the load 3 include, but are not limited to, a power system and a machine, apparatus, or a device operable by AC power.

The power conversion apparatus 1 includes a power converter 10, a voltage detector 11, a current detector 12, and a controller 20. The controller 20 controls the power converter 10 to convert the DC power supplied from the power generation source 2 into AC power and to output the AC power to the load 3.

The voltage detector 11 detects the value of voltage supplied to the power converter 10 from the power generation source 2 (this voltage will be hereinafter referred to as supplied voltage Vin). The current detector 12 detects the value of current supplied to the power converter 10 from the power generation source 2 (this current will be hereinafter referred to as supplied current Iin).

The controller 20 controls the power converter 10 by maximum power point tracking (MPPT) control (which is also referred to as maximum power point following control). For example, based on the supplied current Iin and the supplied voltage Vin, the controller 20 controls the power converter 10 to obtain from the power generation source 2 a maximum level of power that the power generation source 2 is able to supply (this power will be hereinafter referred to as maximum suppliable power).

The controller 20 includes a target command controller 21, a feedback controller 22, and a gain adjustor 23. The target command controller 21 increases or decreases a power-source voltage command Vin* (which is a non-limiting example of the target command recited in the appended claims) so as to cause the power supplied to the power converter 10 from the power generation source 2 (this power will be hereinafter referred to as supplied power Pin) to follow the maximum suppliable power of the power generation source 2.

The feedback controller 22 controls the power converter 10 by feedback control that is based on a deviation between the supplied voltage Vin and the power-source voltage command Vin*. For example, the feedback controller 22 controls the power converter 10 to make the deviation between the supplied voltage Vin and the power-source voltage command Vin* zero.

The gain adjustor 23 adjusts gain of feedback control performed by the feedback controller 22 (this gain will be hereinafter referred to as feedback gain). For example, the gain adjustor 23 outputs to the feedback controller 22 a feedback gain that is based on the supplied voltage Vin, the supplied current Iin, or the power-source voltage command Vin*. This configuration enables the feedback controller 22 to perform the feedback control using a feedback gain that is based on, for example, a power supply characteristic of the power generation source 2.

Figure 1B:
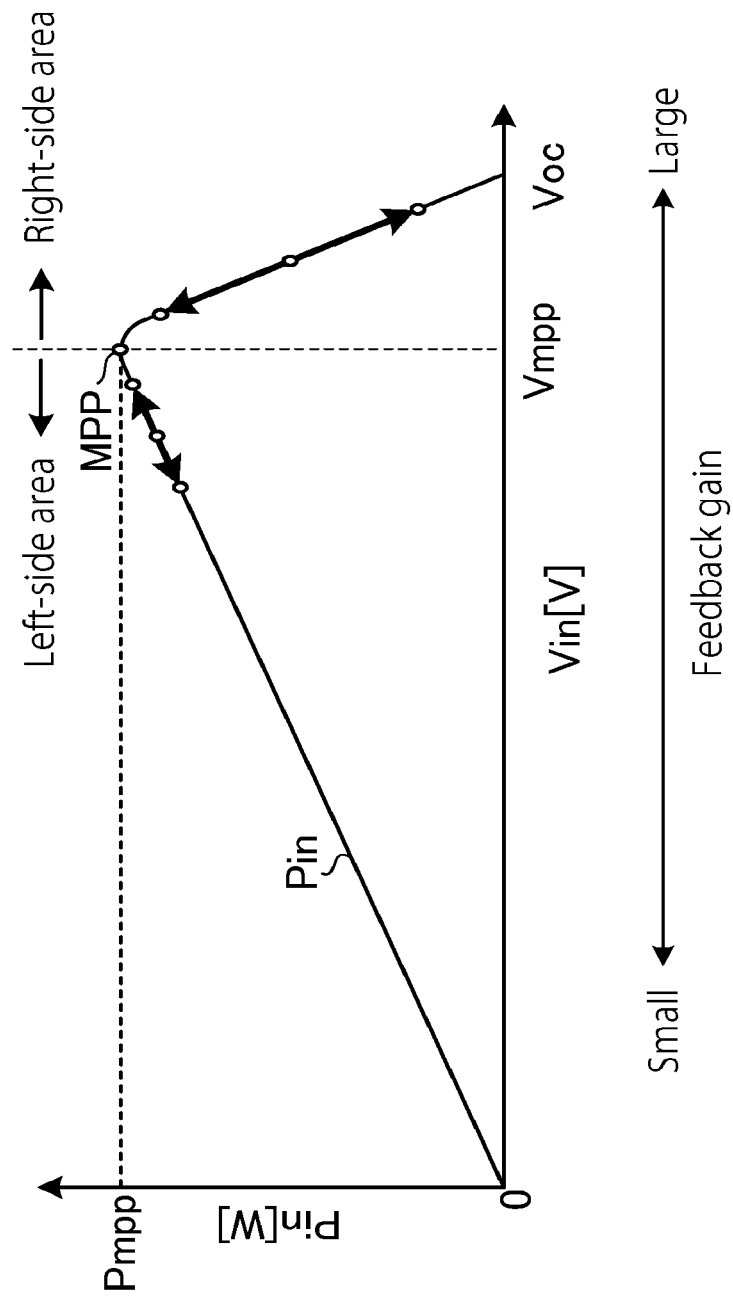
FIG. 1B is a graph illustrating an exemplary relationship between a power supply characteristic of a power generation source and gain of feedback control performed by a power conversion apparatus.

FIG. 1B is a graph illustrating an exemplary relationship between the power supply characteristic of the power generation source 2 and the gain of the feedback control performed by the power conversion apparatus 1. The horizontal axis of the graph denotes the supplied voltage Vin, and the vertical axis of the graph denotes the supplied power Pin. A point at which the supplied power Pin is maximum suppliable power Pmpp will be referred to as maximum power point MPP, and a supplied voltage Vin at the maximum power point MPP will be referred to as maximum power voltage Vmpp.

In the characteristic example illustrated in FIG. 1B, change in the supplied power Pin relative to change in the supplied voltage Vin is larger in an area where the supplied voltage Vin is larger than the maximum power voltage Vmpp (this area will be hereinafter referred to as right-side area) than in an area where the supplied voltage Vin is smaller than the maximum power voltage Vmpp (this area will be hereinafter referred to as left-side area).

In view of this situation, the gain adjustor 23 adjusts the feedback gain of the target command controller 21 so that, for example, the level of the feedback gain where the supplied voltage Vin is in the right-side area is larger than the level of the feedback gain where the supplied voltage Vin is in the left-side area. In FIG. 1B, the arrows on the curve of the supplied power Pin denote images of responsivity.

Adjusting the feedback gain in this manner improves responsivity of the MPPT control, that is, improves maximum power point tracking controllability in an area where change in the supplied power Pin relative to change in the supplied voltage Vin is larger, such as in the right-side area, where the supplied voltage Vin is larger than the maximum power voltage Vmpp.

Adjusting the feedback gain in the above-described manner also ensures that when the MPPT control starts at, for example, the open-circuit voltage, Voc, of the power generation source 2, the maximum power point MPP can be reached more quickly, and ensures that excessive responsiveness is eliminated or minimized in the left-side area, where the feedback gain is smaller.

The power supply characteristic of the power generation source 2 will not be limited to the power supply characteristic illustrated in FIG. 1B; the power conversion apparatus 1 is capable of performing the feedback control using a feedback gain that is based on any other power supply characteristic of the power generation source 2. For example, when the power generation source 2 has such a characteristic that change in the supplied power Pin relative to change in the supplied voltage Vin is smaller in the right-side area than in the left-side area, the gain adjustor 23 makes smaller the level of the feedback gain where the supplied voltage Vin is in the right-side area than the level of the feedback gain where the supplied voltage Vin is in the left-side area.

An exemplary configuration of the power conversion apparatus 1 illustrated in FIG. 1A will be described in more detail below.

2. Power Conversion Apparatus

Figure 2:
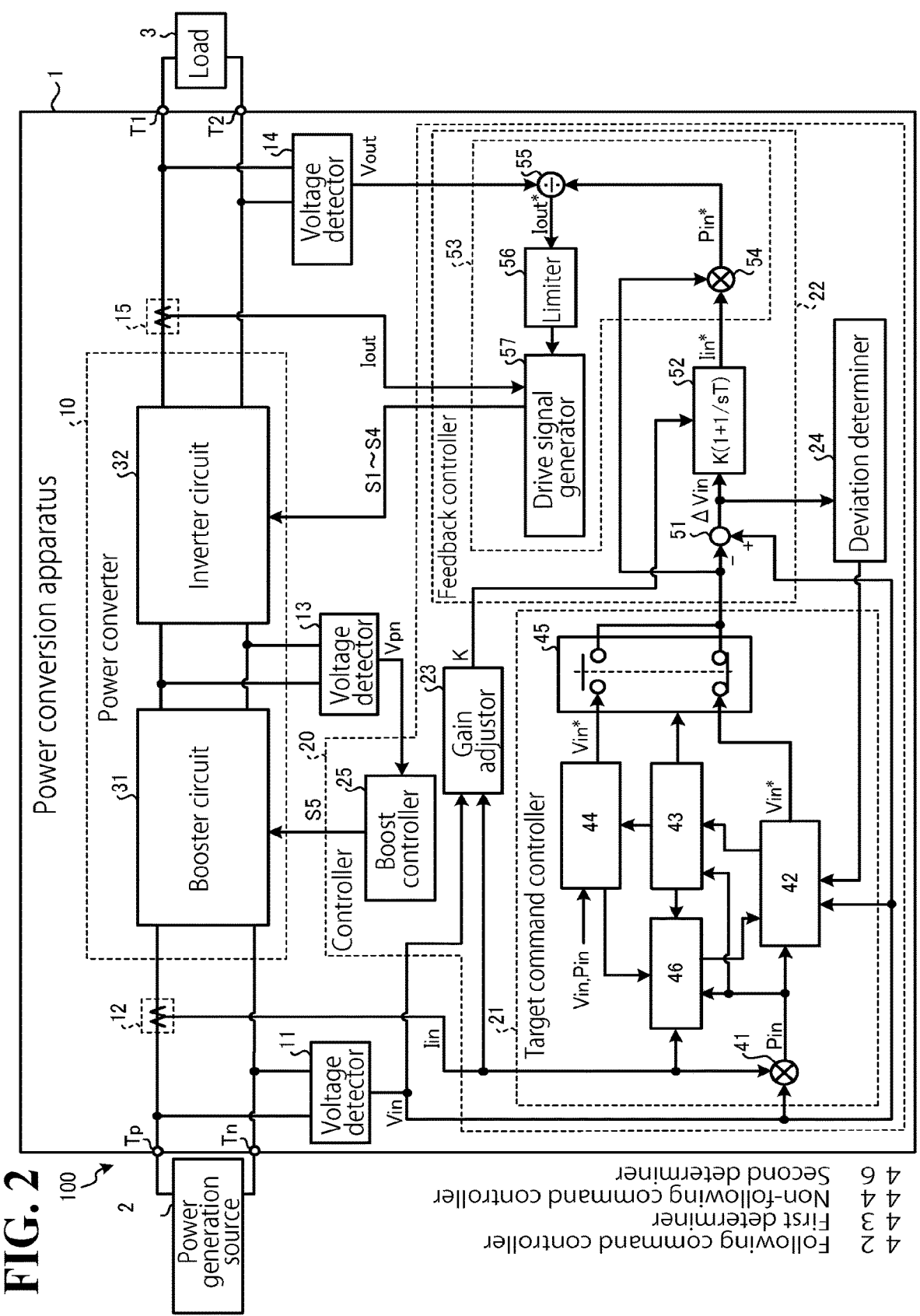
FIG. 2 is a diagram illustrating an exemplary configuration of a power conversion apparatus illustrated in FIG. 1A.

FIG. 2 is a diagram illustrating an exemplary configuration of the power conversion apparatus 1 illustrated in FIG.

1A. As illustrated in FIG. 2, the power conversion apparatus 1 includes the power converter 10, the voltage detector 11, a voltage detector 13, a voltage detector 14, the current detector 12, a current detector 15, an input terminal Tp, an input terminal Tn, an output terminal T1, and an output terminal T2.

The power converter 10 includes a booster circuit 31 and an inverter circuit 32. Examples of the booster circuit 31 include, but are not limited to, a boost chopper circuit and a DC-to-DC converter. Examples of the inverter circuit 32 include, but are not limited to, a single-phase inverter and a three-phase inverter. In another possible embodiment, the power converter 10 may include, instead of the booster circuit 31, a step-down circuit to boost the supplied voltage Vin to a predetermined voltage. In still another possible embodiment, no booster circuit 31 may be provided in the power converter 10.

Figure 3:
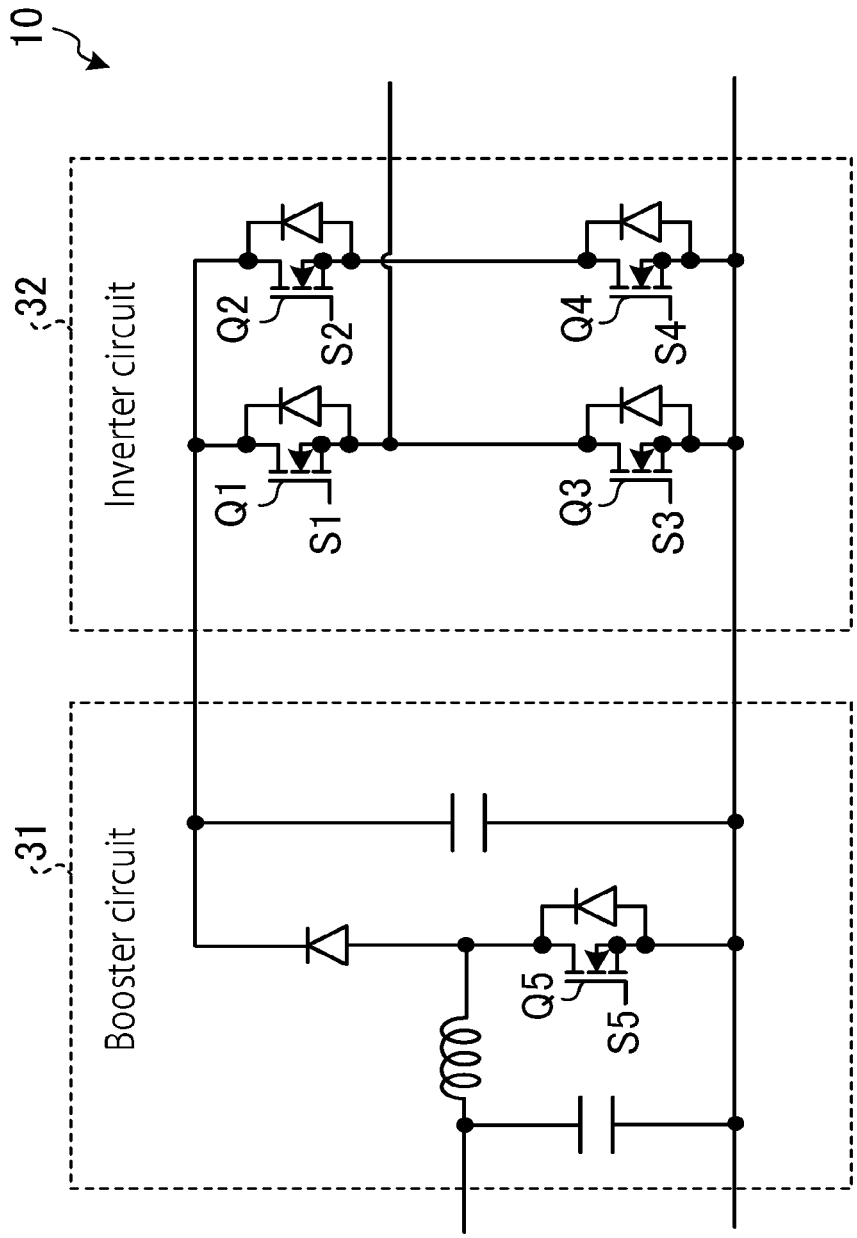
FIG. 3 is a diagram illustrating an exemplary configuration of a power converter illustrated in FIG. 2.

FIG. 3 is a diagram illustrating an exemplary configuration of the power converter 10. As illustrated in FIG. 3, the booster circuit 31 is a chopper circuit that includes a switching element Q5. The switching element Q5 is controlled to turn on and off by a drive signal S5, which is output from the controller 20, so as to boost the supplied voltage Vin to a predetermined voltage in the booster circuit 31. The booster circuit 31 includes an amplifier circuit, not illustrated, to amplify the drive signal S5, which is output from the controller 20, and input the amplified drive signal S5 into the base of the switching element Q5.

As illustrated in FIG. 3, the inverter circuit 32 is a single-phase inverter that includes a plurality of switching elements Q1 to Q4, which are bridge-connected to each other. The switching elements Q1 to Q4 are controlled to turn on and off respectively by drive signals S1 to S4, which are output from the controller 20, so as to convert DC voltage into single-phase AC voltage in the inverter circuit 32. The inverter circuit 32 includes an amplifier circuit, not illustrated, to amplify the drive signals S1 to S4, which are output from the controller 20, and input the amplified drive signals S1 to S4 respectively into the bases of the switching elements Q1 to Q4.

Referring again to FIG. 2, the power conversion apparatus 1 will be further described. The voltage detector 11 detects the supplied voltage Vin, and the current detector 12 detects the supplied current Iin. The voltage detector 13 detects a value of boosted DC voltage output from the booster circuit 31 (this value will be hereinafter referred to as DC voltage Vpn).

The voltage detector 14 detects an effective value of AC voltage output to the load 3 from the power converter 10 (this effective value will be hereinafter referred to as output voltage Vout). The current detector 15 detects an effective value of AC current output to the load 3 from the power converter 10 (this effective value will be hereinafter referred to as output current Iout).

The controller 20 includes the target command controller 21, the feedback controller 22, the gain adjustor 23, a deviation determiner 24, and a boost controller 25. A configuration of the controller 20 will be described in detail below.

The controller 20 includes a microcomputer and various circuits. The microcomputer includes a central processing unit (CPU), a read only memory (ROM), a random access memory (RAM), and input-output ports. The CPU of the microcomputer reads a program stored in the ROM and executes the program so as to control the target command controller 21, the feedback controller 22, the gain adjustor 23, the deviation determiner 24, and the boost controller 25.

Some or all of the target command controller 21, the feedback controller 22, the gain adjustor 23, the deviation determiner 24, and the boost controller 25 may be implemented by hardware such as ASIC (Application Specific Integrated Circuit) and FPGA (Field Programmable Gate Array).

2. 1. Target Command Controller 21

The target command controller 21 increases or decreases the power-source voltage command Vin* to cause the supplied power Pin to follow the maximum power point MPP. For example, the target command controller 21 performs processing of searching for a maximum point of the supplied power Pin (this processing will be hereinafter referred to as mountain climbing processing); and processing of searching for other maximum point than the maximum point searched for in mountain climbing processing (this processing will be hereinafter referred to as mountain searching processing).

The target command controller 21 includes a supplied power detector 41, a following command controller 42 (which is a non-limiting example of the first target command controller recited in the appended claims), a first determiner 43, a non-following command controller 44 (which is a non-limiting example of the second target command controller recited in the appended claims), a switch 45 (which is a non-limiting example of the output switch recited in the appended claims), and a second determiner 46.

The supplied power detector 41 obtains the supplied power Pin based on the supplied voltage Vin and the supplied current Iin. For example, the supplied power detector 41 obtains the supplied power Pin by multiplying the supplied voltage Vin by the supplied current Iin.

The following command controller 42 performs the mountain climbing processing by generating the power-source voltage command Vin* to maximize the supplied power Pin. For example, at the start of the power conversion performed by the power converter 10, the following command controller 42 increases or decreases the power-source voltage command Vin* to search for the maximum power point MPP of the supplied power Pin. Then, the following command controller 42 generates the power-source voltage command Vin* to make the supplied power Pin match the maximum power point WI'.

Figure 4:
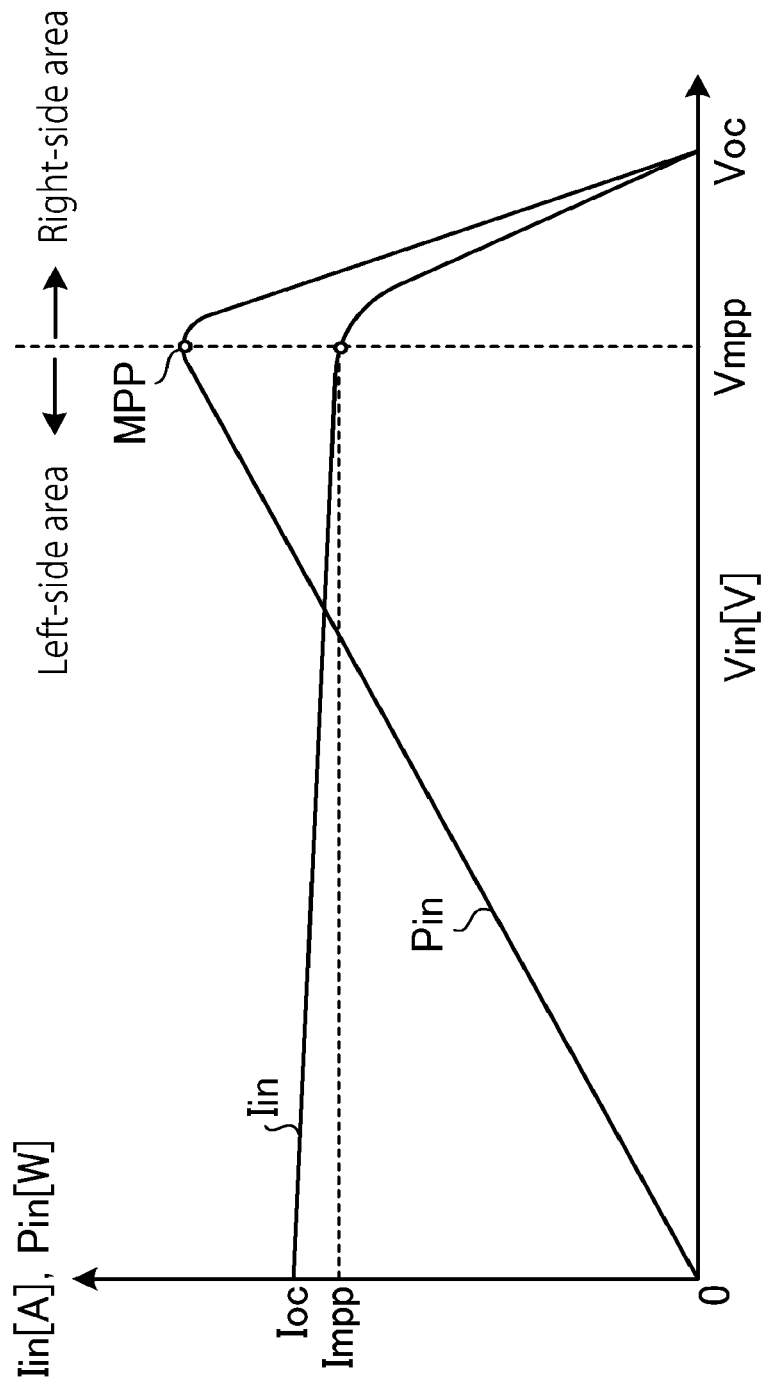
FIG. 4 is a graph illustrating the power supply characteristic of the power generation source.

An example of the mountain climbing processing performed by the following command controller 42 will be described. FIG. 4 is a graph illustrating the power supply characteristic of the power generation source 2. The horizontal axis of the graph denotes the supplied voltage Vin, and the vertical axis of the graph denotes the supplied current Iin and the supplied power Pin.

An example of the mountain climbing processing performed by the following command controller 42 is to subtract a predetermined value $\Delta V1$ from the supplied voltage Vin, set the difference as an initial value V0 of the power-source voltage command Vin*(V0=Vin−$\Delta V1$), and output the initial value V0 to the feedback controller 22. At the start of the mountain climbing processing, the power conversion performed by the power converter 10 has not started yet. Hence, the supplied voltage Vin corresponds to the open-circuit voltage Voc of the power generation source 2.

The predetermined value $\Delta V1$ is set at a value smaller than a value obtained by subtracting the maximum power voltage Vmpp from the open-circuit voltage Voc. Hence, when the power-source voltage command Vin* at its initial value V0 matches the supplied voltage Vin, the supplied voltage Vin is at a level somewhere between the open-circuit voltage Voc and the maximum power voltage Vmpp. With the supplied voltage Vin at this level, the supplied power Pin increases.

As long as the supplied power Pin continues to increase, the following command controller 42 decreases the power-source voltage command Vin* on a predetermined-value ΔV1 basis and outputs the power-source voltage command Vin* to the feedback controller 22. Also, the following command controller 42 decreases the supplied voltage Vin on a predetermined-value ΔV1 basis. In this manner, the following command controller 42 makes the supplied voltage Vin closer to the maximum power voltage Vmpp, away from the open-circuit voltage Voc. This makes the supplied power Pin closer to the maximum power point MPP.

When the supplied power Pin turns into decrease, the following command controller 42 determines that the supplied power Pin is past the maximum power point MPP. Then, the following command controller 42 increases the power-source voltage command Vin* by a predetermined value ΔV2 (<ΔV1), and outputs the increased power-source voltage command Vin* to the feedback controller 22. When the increased power-source voltage command Vin* causes the supplied power Pin to increase, the following command controller 42 determines that the supplied power Pin is past the maximum power point MPP. Then, the following command controller 42 decreases the power-source voltage command Vin* by a predetermined value ΔV3 (<ΔV2), and outputs the decreased power-source voltage command Vin* to the feedback controller 22.

Then, the following command controller 42 repeats the determination making as to whether the maximum power point MPP has been passed by and the decreasing of a predetermined value to increase or decrease the power-source voltage command Vin*. In this manner, the following command controller 42 causes the supplied power Pin to follow the maximum power point MPP. When the maximum power point MPP has changed, the following command controller 42 may, for example, return a predetermined value used to increase or decrease the power-source voltage command Vin* to the predetermined value ΔV1, and then perform the above-described processing. In this manner, the following command controller 42 causes the supplied power Pin to follow the maximum power point MPP.

Referring again to FIG. 2, the target command controller 21 will be further described. The first determiner 43 determines whether the supplied power Pin has reached its maximum point as a result of the following command controller 42's increasing or decreasing the power-source voltage command Vin*, and notifies the non-following command controller 44, the switch 45, and the second determiner 46 of the determination made.

For example, the first determiner 43 determines that the supplied power Pin has reached its maximum point when the first determiner 43 obtains from the following command controller 42 information indicating that the supplied power Pin is past the maximum power point MPP. In another possible embodiment, the first determiner 43 may determine that the supplied power Pin has reached its maximum point when a predetermined value used by the following command controller 42 to increase or decrease the power-source voltage command Vin* has become equal to or smaller than a threshold, or when the rate of change in the supplied power Pin has become equal to or smaller than a threshold.

When the first determiner 43 has determined that the supplied power Pin has reached its maximum point, the switch 45 outputs to the feedback controller 22 the power-source voltage command Vin* generated by the non-following command controller 44 instead of the power-source voltage command Vin* generated by the following command controller 42.

After the non-following command controller 44 has finished its processing of outputting the power-source voltage command Vin*, the switch 45 stops outputting to the feedback controller 22 the power-source voltage command Vin* generated by the non-following command controller 44, and resumes outputting to the feedback controller 22 the power-source voltage command Vin* generated by the following command controller 42.

The non-following command controller 44, irrespective of the change in the supplied power Pin, forces the power-source voltage command Vin* to decrease repeatedly on a predetermined-value ΔVa basis. In this manner, the non-following command controller 44 outputs to the feedback controller 22 through the switch 45 the power-source voltage command Vin* that is on the decrease in a stepped manner, causing the supplied voltage Vin to decrease stepwise. The predetermined value ΔVa may be set at a value larger than the predetermined value ΔV1 in the mountain climbing processing. This configuration increases the speed of the mountain searching processing.

The non-following command controller 44 ends its processing of outputting the power-source voltage command Vin* when, for example, the supplied voltage Vin has become smaller than a tolerance voltage Vth or when the supplied power Pin has become smaller than a tolerance power Pth. This configuration prevents the controller 20 from stopping due to lack of power or a similar cause even when, for example, the controller 20 operates on the power supplied from the power generation source 2.

When the first determiner 43 has determined that the supplied power Pin has reached its maximum point, the second determiner 46 stores the supplied power Pin at its maximum point. Then, while the non-following command controller 44 is outputting the power-source voltage command Vin*, the second determiner 46 determines whether the supplied power Pin output from the supplied power detector 41 has become larger than the supplied power Pin at its maximum point.

When the supplied power Pin output from the supplied power detector 41 has become larger than the supplied power Pin at its maximum point, the second determiner 46 determines that there is another maximum point. Then, the second determiner 46 notifies the following command controller 42 of a value of the power-source voltage command Vin* that was last output from the non-following command controller 44. When the supplied power Pin output from the supplied power detector 41 has not become larger than the supplied power Pin at its maximum point, the second determiner 46 determines that there is no other maximum point.

Based on the determination made by the second determiner 46, the following command controller 42 changes the value of the power-source voltage command Vin*. This configuration ensures that a suitable value of the power-source voltage command Vin* is output based on whether there is another maximum point.

For example, when the second determiner 46 has determined that there is no other maximum point, the following command controller 42 outputs a value of the power-source voltage command Vin* similar to the value of the power-source voltage command Vin* that was last output (previous value). This configuration enables the following command controller 42 to resume the mountain climbing processing, making the searched maximum point the maximum power point MPP and generating the power-source voltage command Vin* to make the supplied power Pin match the maximum power point MPP.

When the second determiner 46 has determined that there is another maximum point, the following command controller 42 outputs a value of the power-source voltage command Vin* similar to the value of the power-source voltage command Vin* that was last output from the non-following command controller 44. In this manner, the following command controller 42 starts mountain climbing processing with respect to the another maximum point.

Figure 5:
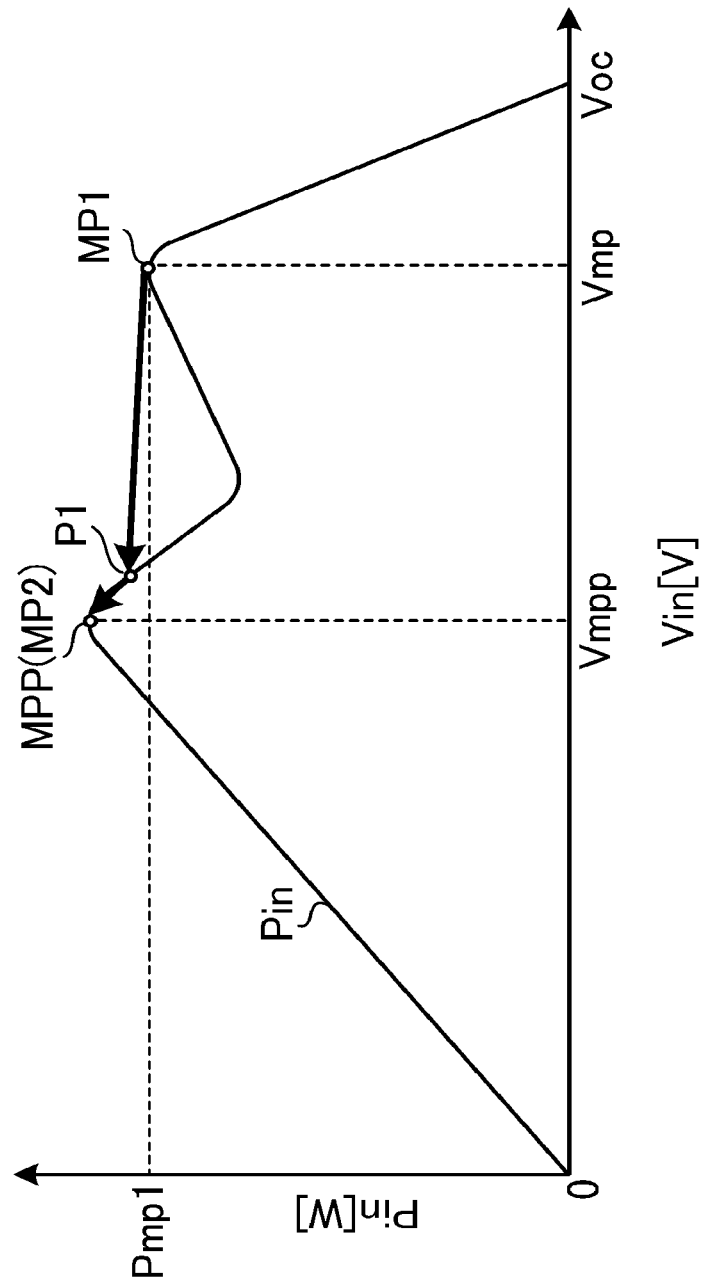
FIG. 5 is a graph illustrating an exemplary power supply characteristic of the power generation source where the power generation source has two maximum points.

It is assumed that the power generation source 2 has a power supply characteristic illustrated in FIG. 5. FIG. 5 is a graph illustrating an exemplary power supply characteristic of the power generation source 2 where the power generation source 2 has two maximum points. For example, when the power generation source 2 is a solar cell, the power supply characteristic illustrated in FIG. 5 can be seen by influence of partial shadowing on the solar cell.

In the mountain climbing processing, the target command controller 21 searches for maximum point MP1 illustrated in FIG. 5. Then, in the mountain searching processing, the target command controller 21 determines whether there is a value of the supplied power Pin that is larger than the value, Pmp1, of the searched maximum point MP1. In the example illustrated in FIG. 5, the target command controller 21 finds in the mountain searching processing a value, P1, of the supplied power Pin that is larger than the value Pmp1 of the maximum point MP1. Then, the target command controller 21 performs mountain climbing processing with respect to the another maximum point, MP2.

This configuration enables the target command controller 21 to search for the maximum power point MPP even if there are two or more maximum points, and to output a power-source voltage command Vin* that is based on the maximum power point MPP. Specifically, the maximum power point MPP is searched for with improved accuracy even when the supplied power Pin of the power generation source 2 has two or more maximum points and it is difficult to search for the maximum power point MPP in the mountain climbing processing alone.

Figure 6:
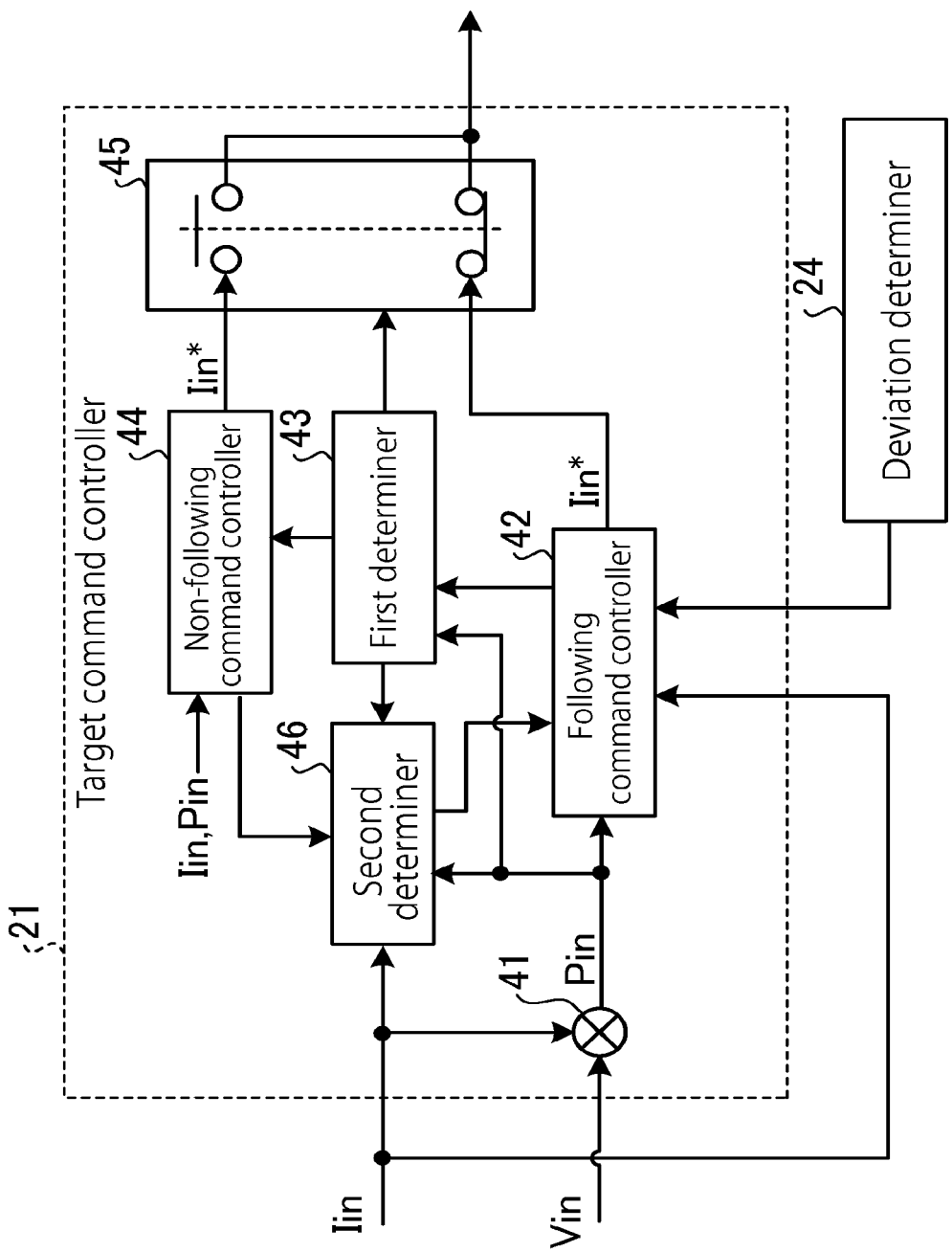
FIG. 6 is a diagram illustrating an exemplary configuration of a target command controller where a power source current command is used as a target command.

While the target command controller 21 illustrated in FIG. 2 uses the power-source voltage command Vin* as the target command, the target command controller 21 may alternatively use a power source current command Iin* as the target command. FIG. 6 is a diagram illustrating an exemplary configuration of the target command controller 21 where the power source current command Iin* is used as the target command.

The target command controller 21 illustrated in FIG. 6 uses current as opposed to the target command controller 21 illustrated in FIG. 2, which uses voltage. The target command controller 21 illustrated in FIG. 6 uses the power source current command Iin*, the supplied current Iin, maximum power current Impp, release current Ioc, an initial value I0, predetermined values ΔI1 to ΔI3, and tolerance current Ith, instead of using the power-source voltage command Vin*, the supplied voltage Vin, the maximum power voltage Vmpp, the open-circuit voltage Voc, the initial value V0, the predetermined values ΔV1 to ΔV3, and the tolerance voltage Vth.

2. 2. Feedback Controller 22

The feedback controller 22 illustrated in FIG. 2 will be described. The feedback controller 22 controls the power converter 10 based on the power-source voltage command Vin* output from the target command controller 21. As illustrated in FIG. 2, the feedback controller 22 includes a subtractor 51, a command generator 52, and a drive controller 53.

The subtractor 51 obtains the difference, ΔVin, between the power-source voltage command Vin* and the supplied voltage Vin by, for example, subtracting the supplied voltage Vin from the power-source voltage command Vin*.

A non-limiting example of the command generator 52 is a PI controller. The command generator 52 performs proportional integration (PI) control with respect to the difference ΔVin so as to obtain the power source current command Iin*. Control gain K (which is a non-limiting example of the feedback gain recited in the appended claims) is set in the command generator 52 by the gain adjustor 23. The command generator 52 uses the control gain K to perform the PI control with respect to the difference ΔVin. In this embodiment, the control gain K is proportional integration gain (which is a combination of proportional gain and integration gain). In another possible embodiment, the control gain K may be made up of proportional gain alone.

The command generator 52 is capable of performing the PI control based on control gain K adjusted by the gain adjustor 23. This improves maximum power point trackability in the MPPT control. The adjustment of the control gain K will be detailed later.

The command generator 52 may include, instead of the PI controller, a PID controller, a P controller, or a PD controller. The PID controller performs proportional integral derivative (PID) control. The P controller performs proportional (P) control. The PD controller performs proportional derivative (PD) control. Each of these cases is similar to the case of the PI controller in that the gain adjustor 23 sets the control gain K. In the case of the PID controller, the control gain K is proportional integration differentiation gain (which is a combination of proportional gain, integration gain, and differentiation gain). It is also possible to use proportional gain alone as the control gain K. In the case of the PD controller, the control gain K is proportional gain and differentiation gain. It is also possible to use proportional gain alone as the control gain K.

The drive controller 53 generates the drive signals S1 to S4, which are used to drive the power converter 10, based on the power source current command Iin* output from the command generator 52. The drive controller 53 includes a power command generator 54, an output current command generator 55 (which is a non-limiting example of the output command generator recited in the appended claims), a limiter 56, and a drive signal generator 57.

The power command generator 54 obtains a power source power command Pin* by, for example, multiplying the power source current command Iin* by the power-source voltage command Vin*. In another possible embodiment, the power command generator 54 may take the power conversion efficiency, ζ, of the power converter 10 into consideration in obtaining the power source power command Pin*. Specifically, the power command generator 54 may obtain the power source power command Pin* by multiplying the power source current command Iin* and the power-source voltage command Vin* and dividing the efficiency ζ by the product.

The power command generator 54 is also capable of obtaining the power source power command Pin* by multiplying the power source current command Iin* by the supplied voltage Vin. The power command generator 54 is also capable of obtaining the power source power command Pin* by multiplying the supplied current Iin by the power-source voltage command Vin*. The power command generator 54 is also capable of obtaining the power source power command Pin* by multiplying the supplied current Iin by the supplied voltage Vin.

Insofar as the power command generator 54 is capable of obtaining the power source power command Pin* based on the power supply characteristic of the power generation source 2, the power command generator 54 may use any other method of calculation than the above-described methods of calculation to obtain the power source power command Pin*. For example, the power command generator 54 may obtain the power source power command Pin* by multiplying an average value of the power source current command Iin* and the supplied current Iin by an average value of the power-source voltage command Vin* and the supplied voltage Vin.

The output current command generator 55 obtains an output current command Iout* by, for example, dividing the power source power command Pin* by the output voltage Vout. The limiter 56 limits the output current command Iout* to equal to or smaller than a predetermined value. The drive signal generator 57 generates the drive signals S1 to S4 to, for example, make the output current Iout match the output current command Iout*, and outputs the drive signals S1 to S4 to the inverter circuit 32. Insofar as the output current command generator 55 is capable of controlling the output (for example, output power) of the power converter 10 based on the power source power command Pin*, the output current command generator 55 may control the output voltage Vout, instead of the output current Iout.

Thus, the feedback controller 22 generates, at the command generator 52, the power source current command Iin* to make the power-source voltage command Vin* and the supplied voltage Vin match each other, and generates the power source power command Pin* based on the power source current command Iin*.

Then, based on the power source power command Pin*, the feedback controller 22 generates the output current command Iout*. This configuration improves maximum power point trackability compared with the case where, for example, the command generator 52 generates the output current command Iout* to make the power-source voltage command Vin* and the supplied voltage Vin match each other.

Figure 7:
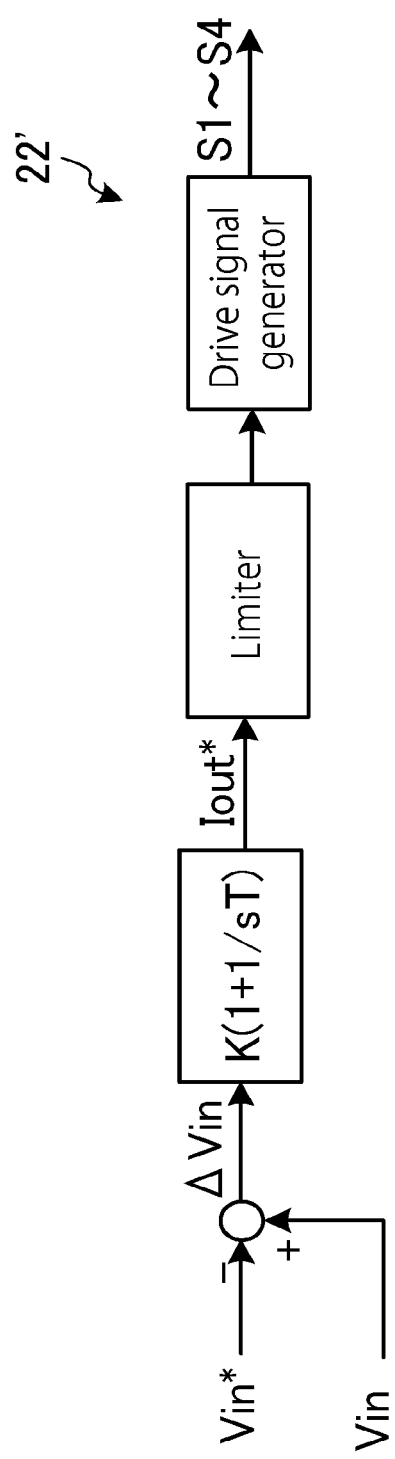
FIG. 7 is a diagram illustrating an exemplary configuration of another feedback controller of a controller.

For example, it is assumed that the output current command Iout* is generated by PI control to make the power-source voltage command Vin* and the supplied voltage Vin match each other, as illustrated in FIG. 7. FIG. 7 is a diagram illustrating an exemplary configuration of another feedback controller of the controller 20.

As illustrated in FIG. 7, when the supplied voltage Vin becomes smaller than the power-source voltage command Vin*, a feedback controller 22' decreases the output current command Iout*, causing output power Pout (=Iout×Vout) to decrease. When the supplied voltage Vin becomes larger than the power-source voltage command Vin*, the feedback controller 22' increases the output current command Iout*, causing the output power Pout to increase.

After the target command controller 21 has started the mountain climbing processing, the power-source voltage command Vin* decreases, causing the supplied voltage Vin to become larger than the power-source voltage command Vin*. In response, the feedback controller 22' increases the output current command Iout*. Increasing the output current command Iout* causes the output power Pout to increase and makes the supplied power Pin closer to the maximum power point MPP, resulting in improved performance of the mountain climbing processing.

When the supplied voltage Vin has entered the left-side area, where the supplied voltage Vin is equal to or smaller than the maximum power voltage Vmpp, to become larger than the power-source voltage command Vin*, the feedback controller 22' increases the output current command Iout*. Increasing the output current command Iout* makes the power converter 10 liable to obtain more of the power from the power generation source 2. This causes the supplied voltage Vin to decrease below the power-source voltage command Vin*, resulting in degraded maximum power point trackability compared with the right-side area. It is also possible for the supplied voltage Vin to decrease significantly below the power-source voltage command Vin*.

In contrast, the feedback controller 22 illustrated in FIG. 2 generates the power source current command Iin* to make the power-source voltage command Vin* and the supplied voltage Vin match each other, and generates the output current command Iout* based on the power source current command Iin*.

This causes the supplied current Iin to be controlled by the power source current command Iin*, and causes the supplied voltage Vin to be controlled by the power-source voltage command Vin*. As a result, the change in the power source power command Pin* generated by the power source current command Iin* and the power-source voltage command Vin* relative to the supplied voltage Vin approximately matches the change in the supplied power Pin illustrated in FIG. 4.

When in the left-side area the supplied voltage Vin becomes larger than the power-source voltage command Vin*, the feedback controller 22 increases the power source current command Iin*. In the left-side area, when the power source current command Iin* increases, the power source power command Pin* decreases, causing the output current command Iout* to decrease. This causes the output power Pout to decrease.

When in the left-side area the supplied voltage Vin becomes smaller than the power-source voltage command Vin*, the feedback controller 22 decreases the power source current command Iin*. In the left-side area, when the power source current command Iin* decreases, the power source power command Pin* increase, causing the output current command Iout* to increase. This causes the output power Pout to increase.

Thus, when in the left-side area the supplied voltage Vin becomes larger than the power-source voltage command Vin*, the feedback controller 22 decreases the output power Pout. When in the left-side area the supplied voltage Vin becomes smaller than the power-source voltage command Vin*, the feedback controller 22 increases the output power Pout. This configuration enables the feedback controller 22 to control the output power Pout based on the power supply characteristic of the power generation source 2. This enables the supplied voltage Vin to correctly follow the power-source voltage command Vin*, resulting in improved maximum power point trackability compared with the feedback controller 22'.

When in the right-side area the supplied voltage Vin becomes larger than the power-source voltage command Vin*, the feedback controller 22 increases the power source current command Iin* to increase the output power Pout. When in the right-side area the supplied voltage Vin becomes smaller than the power-source voltage command Vin*, the feedback controller 22 decreases the power source current command Iin* to decrease the output power Pout.

This configuration enables the feedback controller 22 to improve maximum power point trackability similarly to the feedback controller 22'.

When the controller 20 is provided with the feedback controller 22', the controller 20 performs the feedback control based on the control gain K adjusted by the gain adjustor 23, similarly to the case where the controller 20 is provided with the feedback controller 22. Performing the feedback control lowers responsivity to the difference between the power-source voltage command Vin* and the supplied voltage Vin in the left-side area, eliminating or minimizing excessive decrease of the supplied voltage Vin. As a result, maximum power point trackability improves compared with the case where the control gain K is fixed.

Figure 8:
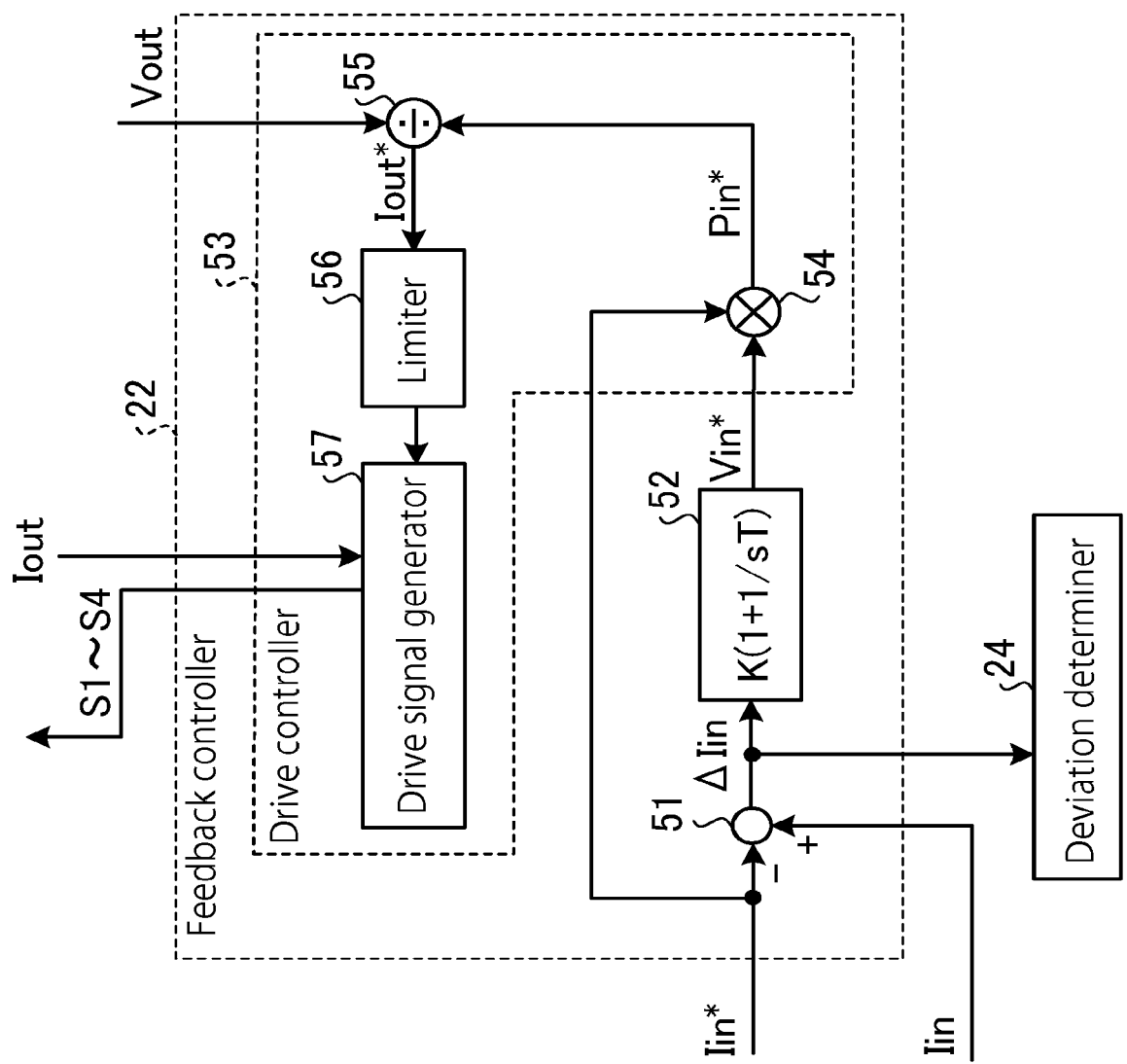
FIG. 8 is a diagram illustrating an exemplary configuration of the feedback controller where a power source current command is used as the target command.

When the target command controller 21 uses the power source current command Iin* as the target command, the feedback controller 22 may use the power source current command Iin* as the target command. FIG. 8 is a diagram illustrating an exemplary configuration of the feedback controller 22 where the power source current command Iin* is used as the target command.

As illustrated in FIG. 8, the feedback controller 22 includes the subtractor 51, the command generator 52, and the drive controller 53. The subtractor 51 obtains the difference, ΔIin, between the power source current command Iin* and the supplied current Iin by, for example, subtracting the supplied current Iin from the power source current command Iin*.

The command generator 52 performs PI control with respect to the difference ΔIin so as to obtain the power-source voltage command Vin*. The control gain K is set in the command generator 52 by the gain adjustor 23. The command generator 52 uses the control gain K to perform the PI control with respect to the difference ΔIin. The feedback controller 22 illustrated in FIG. 8 may include a PID controller, a P controller, or a PD controller, instead of the PI controller.

When the command generator 52 is a P controller or a PD controller, the command generator 52 may generate the power source power command Pin* based on the power-source voltage command Vin*, the power source current command Iin*, and a steady-state deviation. This configuration ensures that even when there is a steady-state deviation, the power source power command Pin* is generated with improved accuracy.

For example, when the steady-state deviation is a positive value, the command generator 52 may generate the power source power command Pin* by subtracting the steady-state deviation from the power-source voltage command Vin* and integrating the resulting difference with the power source current command Iin*. When the steady-state deviation is a negative value, the command generator 52 may generate the power source power command Pin* by adding the steady-state deviation to the power-source voltage command Vin* and integrating the sum with the power source current command Iin*.

The drive controller 53 has a configuration similar to the configuration of the drive controller 53 illustrated in FIG. 2, and generates the drive signals S1 to S4, which are used to drive the power converter 10, based on the power-source voltage command Vin* output from the command generator 52.

The command generator 52 illustrated in FIG. 8 performs PI control, PID control, P control, or PD control based on the control gain K adjusted by the gain adjustor 23, similarly to the drive controller 53 illustrated in FIG. 2. This improves maximum power point trackability in the MPPT control.

The feedback controller 22 illustrated in FIG. 8 generates, at the command generator 52, the power-source voltage command Vin* to make the power source current command Iin* and the supplied current Iin match each other, and generates the power source power command Pin* based on the power-source voltage command Vin*. Then, based on the power source power command Pin*, the feedback controller 22 generates the output current command Iout*. This configuration improves maximum power point trackability compared with the case where the output current command Iout* is output from the command generator 52 (see FIG. 7).

2. 3. Gain Adjustor 23

The gain adjustor 23 illustrated in FIG. 2 will be described. The gain adjustor 23 includes a table or an equation that correlates the control gain K with the supplied voltage Vin or the supplied current Iin. Using the table or the equation, the gain adjustor 23 adjusts the control gain K based on the supplied voltage Vin or the supplied current Iin.

The gain adjustor 23 may perform an arithmetic operation represented by, for example, the following Formula (1) to obtain control gain K that is based on the supplied voltage Vin. Then, the gain adjustor 23 sets the obtained control gain K in the command generator 52 of the feedback controller 22. As used in Formula (1), K1 is a coefficient that is set at a predetermined value.

$$K = K1 \times V\mathrm{in} \tag{1}$$

Figure 9:
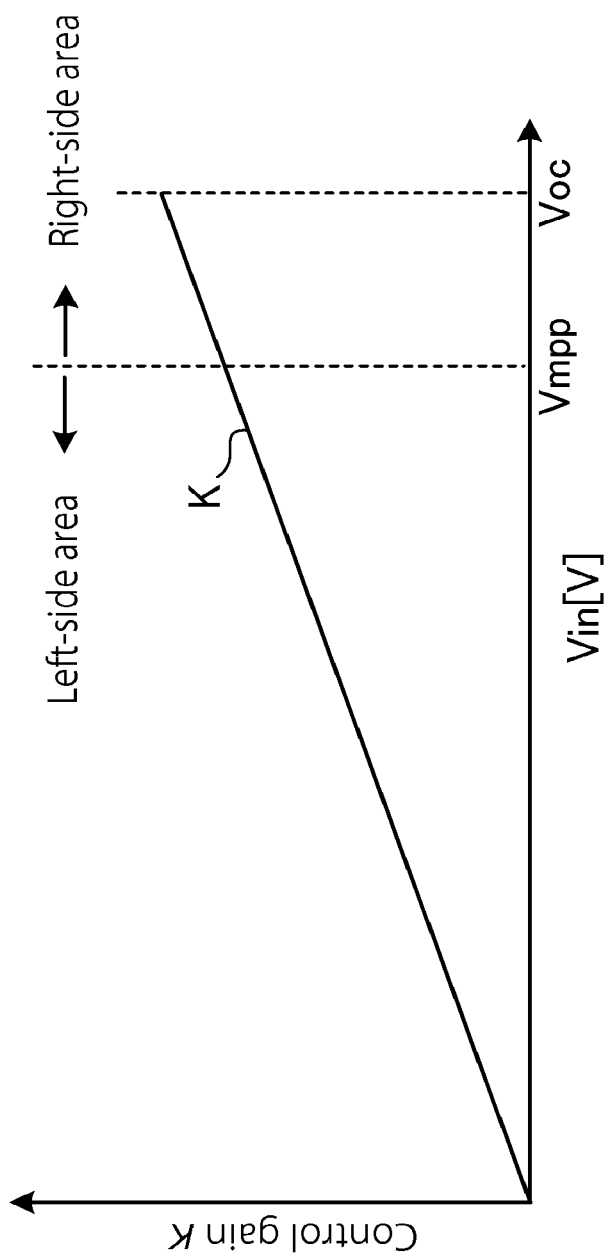
FIG. 9 is a graph illustrating an exemplary relationship between control gain and supplied voltage.

As a result, control gain K that is based on the supplied voltage Vin is set in the command generator 52 of the feedback controller 22, as illustrated in FIG. 9. FIG. 9 is a graph illustrating an exemplary relationship between the control gain K and the supplied voltage Vin.

In another possible embodiment, the gain adjustor 23 may store a table of results of arithmetic operations of Formula (1) where Vin ranges from, for example, predetermined value Vmin to rated input voltage Vmax. From the stored table, the gain adjustor 23 obtains control gain K that is based on the supplied voltage Vin, and sets the control gain K in the command generator 52 of the feedback controller 22.

Thus, the gain adjustor 23 is capable of making the control gain K larger in the right-side area than in the left-side area. This enables the power conversion apparatus 1 to improve maximum power point trackability in MPPT control, and eliminate or minimize excessive decrease of the supplied voltage Vin even when the supplied voltage Vin is in the left-side area.

For example, when the power generation source 2 has the power supply characteristic illustrated in FIG. 4, the rate of change in the supplied current Iin relative to the change in the supplied voltage Vin is higher in the right-side area than in the left-side area. In this case, making the control gain K in the right-side area larger than the control gain K in the left-side area improves the trackability of the supplied current Iin to the power source current command Iin* in the right-side area. This configuration shortens the time before the supplied power Pin reaches the maximum power point MPP in the mountain climbing processing.

When in the right-side area the supplied voltage Vin becomes smaller than the power-source voltage command Vin*, the feedback controller 22 increases the output current command Iout*. In this case, making the control gain K as large as the control gain K in the left-side area improves responsivity to the increase of the output current command Iout*. This, in turn, makes the amount of decrease of the supplied voltage Vin larger. When there is a comparatively large difference between the supplied voltage Vin and the power-source voltage command Vin*, it is possible for the supplied voltage Vin to decrease excessively.

In view of this possibility, the gain adjustor 23 makes the control gain K in the left-side area smaller than the control gain K in the right-side area. This eliminates or minimizes excessive decrease of the supplied voltage Vin even when the supplied voltage Vin becomes comparatively small relative to the power-source voltage command Vin* in the left-side area.

As illustrated in FIG. 9, the gain adjustor 23 increases the control gain K as the supplied voltage Vin increases. This configuration ensures that the control gain K is larger in the right-side area than in the left-side area even when the maximum power voltage Vmpp (see FIG. 4) has changed. Further, the gain adjustor 23 determines the control gain K based on the supplied voltage Prin. This configuration ensures that as the supplied voltage Vin becomes smaller than the power-source voltage command Vin*, the control gain K becomes smaller accordingly. This, as a result, improves effectiveness of eliminating or minimizing excessive decrease of the supplied voltage Vin.

When the power generation source 2 is a solar cell, the gain adjustor 23 may further adjust the control gain K based on the amount of solar radiation to the solar cell. For example, the gain adjustor 23 may increase the control gain K as the amount of solar radiation increases.

While the controller 20 is not controlling the power converter 10, the supplied voltage Vin corresponds to the open-circuit voltage Voc. The open-circuit voltage Voc increases as the amount of solar radiation to solar voltage increases. In view of this situation, at the time of starting the control of the power converter 10, the controller 20 sets control gain K that is based on the open-circuit voltage Voc.

The gain adjustor 23 may perform an arithmetic operation represented by, for example, the following Formula (2) to obtain control gain K that is based on the supplied voltage Vin. Then, the gain adjustor 23 sets the obtained control gain K in the command generator 52 of the feedback controller 22. As used in Formula (2), f(Voc) is an equation to obtain an adjustment coefficient that is based on the open-circuit voltage Voc.

$$K = K1 \times Vin \times f(Voc) \quad (2)$$

This configuration enables the power converter 10 to further shorten the time before the supplied power Pin reaches the maximum power point MPP in the mountain climbing processing, resulting in further improved maximum power point trackability.

Incidentally, the open-circuit voltage Voc cannot be detected after the start of the MPPT control. The supplied power Pin at the maximum power point MPP (hereinafter referred to as maximum suppliable power Pmpp) increases as the amount of solar radiation to solar voltage increases. In view of this situation, after the supplied power Pin has reached the maximum power point MPP, the gain adjustor 23 adjusts the control gain K based on the level of the maximum suppliable power Pmpp.

The gain adjustor 23 may perform an arithmetic operation represented by, for example, the following Formula (3) to obtain control gain K that is based on the supplied voltage Vin. Then, the gain adjustor 23 sets the obtained control gain K in the command generator 52 of the feedback controller 22.

$$K = K1 \times Vin \times f(Pmpp) \quad (3)$$

As used in Formula (3), f(Pmpp) is an equation to obtain an adjustment coefficient that is based on the maximum suppliable power Pmpp, and can be represented by an arithmetic operation represented by, for example, the following Formula (4).

$$f(Pmpp) = K2 \times Pmpp \quad (4)$$

The gain adjustor 23 may include a detector that directly detects the amount of solar radiation, instead of detecting the open-circuit voltage Voc or the maximum suppliable power Pmpp. Based on the result of the detection performed by the detector, the gain adjustor 23 may adjust the control gain K.

The gain adjustor 23 may include a table or an equation that correlates the supplied current Iin with the control gain K. Using the table or the equation, the gain adjustor 23 may obtain control gain K that is based on the supplied current Iin and set the control gain K in the feedback controller 22. For example, the gain adjustor 23 may replace "Vin" of Formulae (1) to (3) with "1/Iin" and perform operations of the resulting Formulae so as to obtain the control gain K that is based on the supplied current Iin.

The gain adjustor 23 may not necessarily use Formulae (1) to (3) to adjust the control gain K. It is also possible to adjust the control gain K based on the relationship between the supplied voltage Vin and the maximum power voltage Vmpp (see FIG. 4) or based on the relationship between the supplied current Iin and the maximum power current Impp (see FIG. 4). This configuration equally makes the control gain K in the right-side area larger than the control gain K in the left-side area.

After the target command controller 21 has started the mountain climbing processing, the gain adjustor 23 sets the control gain K at a predetermined value k1 until the supplied voltage Vin or the supplied current Iin reaches the maximum power voltage Vmpp or the maximum power current Impp. After the supplied voltage Vin or the supplied current Iin has reached the maximum power voltage Vmpp or the maximum power current Impp, the gain adjustor 23 sets the control gain K at a predetermined value k2 (<k1).

Thus, the gain adjustor 23 is capable of changing the control gain K before and after the supplied voltage Vin or the supplied current Iin reaches the maximum power voltage Vmpp or the maximum power current Impp, which corresponds to the maximum suppliable power Pmpp. This configuration shortens the time before the supplied power Pin reaches the maximum power point MPP in the mountain climbing processing, resulting in improved maximum power point trackability.

The gain adjustor 23 may store information indicating a relationship between the open-circuit voltage Voc and the maximum power voltage Vmpp. Using the information, the gain adjustor 23 may determine the maximum power voltage Vmpp based on the open-circuit voltage Voc at the start of the control of the power converter 10. In this case, the gain adjustor 23 may set the control gain K at the predetermined value k1 when the supplied voltage Vin is larger than the maximum power voltage Vmpp, and set the control gain K at the predetermined value k2 (<k1) when the supplied voltage Vin is smaller than the maximum power voltage Vmpp.

In another possible embodiment, the gain adjustor 23 may obtain the control gain K based on the supplied voltage Vin and the supplied current Iin. For example, the gain adjustor 23 may obtain an average value of control gain for the supplied voltage Vin and control gain for the supplied current Iin, and determine the average value as the control gain K.

The gain adjustor 23 may adjust control gain K that is based on the power-source voltage command Vin*. The control gain K that is based on the power-source voltage command Vin* can be made by replacing the above-described "Vin" with "Vin*". For example, the gain adjustor 23 may perform an arithmetic operation represented by Formula (5) to obtain the control gain K that is based on the power-source voltage command Vin*.

$$K = K1 \times Vin* \tag{5}$$

The gain adjustor 23 may obtain control gain K that is based on the power source current command Iin*, and set the obtained control gain K in the command generator 52 of the feedback controller 22. The control gain K that is based on the power source current command Iin* can be made by replacing the above-described "Iin" with "Iin*".

2. 4. Deviation Determiner 24

The deviation determiner 24 determines whether the supplied voltage Vin is larger than the power-source voltage command Vin* by equal to or larger than a predetermined value Vlim, and notifies the following command controller 42 of the result of the determination.

When the deviation determiner 24 has determined that the supplied voltage Vin is larger than the power-source voltage command Vin* by equal to or larger than the predetermined value Vlim, the following command controller 42 sets the supplied voltage Vin at the power-source voltage command Vin*. This causes the power-source voltage command Vin* to match the supplied voltage Vin, making the output of the subtractor 51 zero and causing the change in output of the command generator 52 to stop. As a result, the power-source voltage command Vin* is in the right-side area, and the mountain climbing processing performed by the target command controller 21 starts in the right-side area.

Figure 10:
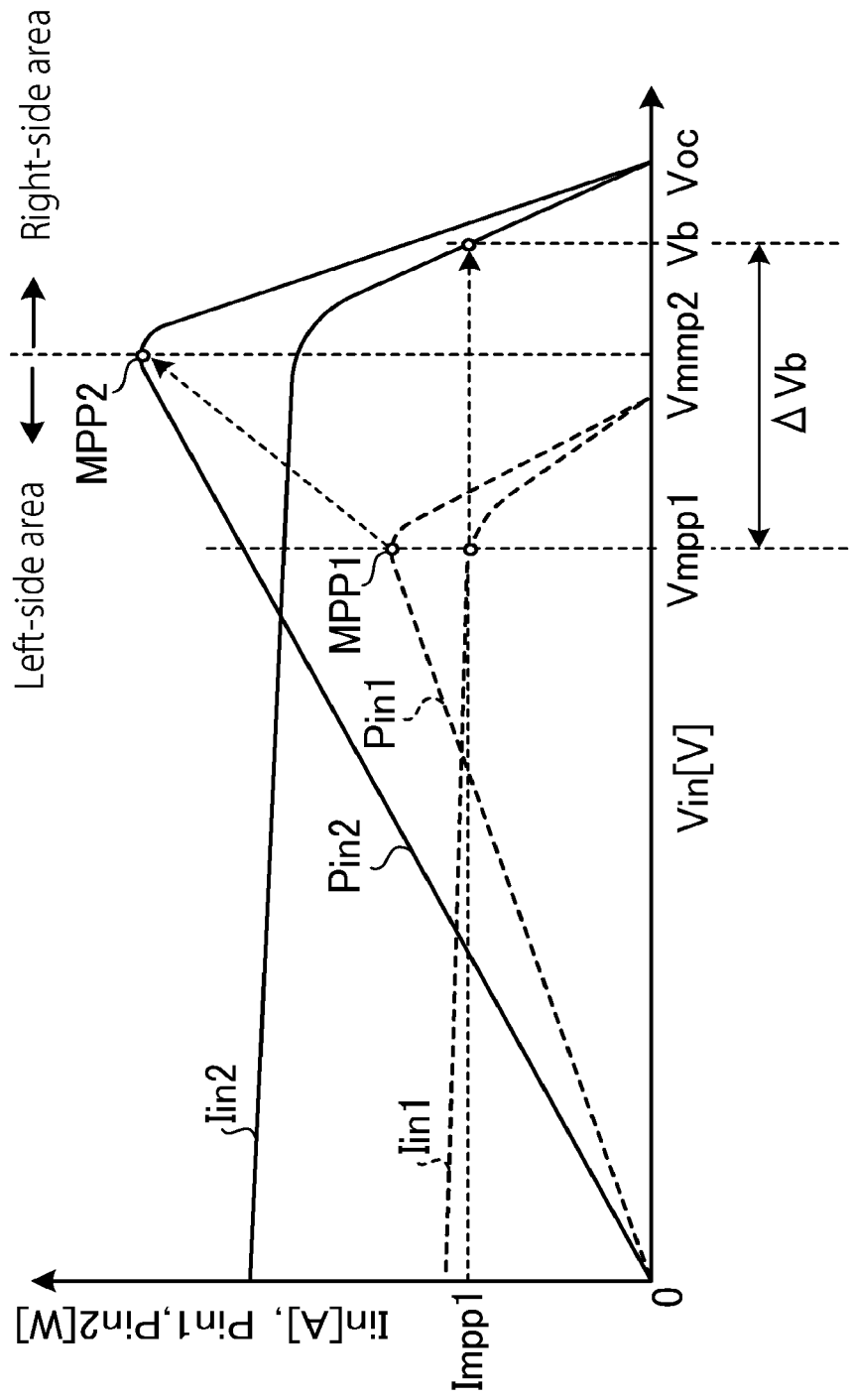
FIG. 10 is a graph illustrating an operation at the time of a rapid change in the power supply characteristic of the power generation source.

FIG. 10 is a graph illustrating an operation at the time of a rapid change in the power supply characteristic of the power generation source 2. As illustrated in FIG. 10, it is assumed that the power supply characteristic of the power generation source 2 has changed rapidly from Pin1 to Pin2, causing the maximum power point to change from MPP1 to MPP2. For example, when the power generation source 2 is a solar cell, the change in the maximum power point illustrated in FIG. 10 occurs when the amount of solar radiation to the solar cell has changed rapidly from low state to high state.

When the supplied voltage Vin immediately before the power supply characteristic of the power generation source 2 changes rapidly is maximum power voltage Vmpp1, the supplied current Iin is maximum power current Impp1. At the point of time when the power supply characteristic of the power generation source 2 changes rapidly from Pin1 to Pin2, the output current command Iout* has not changed. Hence, the supplied current Iin is the maximum power current Impp1, and the supplied voltage Vin changes to voltage Vb.

The power-source voltage command Vin* is identical to the maximum power voltage Vmpp1. Hence, the difference between the power-source voltage command Vin* and the supplied voltage Vin is value (ΔVb) obtained by subtracting the maximum power voltage Vmpp1 from the voltage Vb.

The deviation determiner 24 determines whether the value ΔVb is equal to or larger than the predetermined value Vlim. When the value ΔVb is equal to or larger than the predetermined value Vlim, the following command controller 42 sets the voltage Vb in the power-source voltage command Vin*. Since the power-source voltage command Vin* is identical to the voltage Vb, the output of the subtractor 51 becomes zero, causing the change in output of the command generator 52 to stop momentarily and then the mountain climbing processing to start in the right-side area.

Thus, even when the power supply characteristic of the power generation source 2 changes rapidly, the controller 20 controls the target command controller 21 to start the mountain climbing processing in the right-side area. This configuration improves maximum power point trackability and prevents an excessive amount of power from being extracted momentarily from the power generation source 2.

When the feedback controller 22 has the configuration illustrated in FIG. 8, the feedback controller 22 determines whether the supplied current Iin is larger than the power source current command Iin* by equal to or larger than a predetermined value Ilim. The deviation determiner 24 notifies the following command controller 42 of information indicating whether the supplied current Iin is larger than the power source current command Iin* by equal to or larger than the predetermined value Ilim.

When the deviation determiner 24 has determined that the supplied current Iin is larger than the power source current command Iin* by equal to or larger than the predetermined value Ilim, the following command controller 42 sets the supplied current Iin in the power source current command Iin*. This causes the power source current command Iin* to match the supplied current Iin, making the output of the subtractor 51 zero and causing the change in output of the command generator 52 to stop. As a result, the supplied voltage Vin is in the right-side area, and the mountain climbing processing performed by the target command controller 21 starts in the right-side area.

2. 5. Boost Controller 25

The boost controller 25 generates the drive signal S5 to make the DC voltage Vpn a predetermined value, and outputs the predetermined value of the DC voltage Vpn to the booster circuit 31. The DC voltage Vpn is a voltage resulting from boosting by the booster circuit 31. A non-limiting example of the drive signal S5 is a PWM signal.

3. Flow of Control Performed by Controller 20

Figure 11:
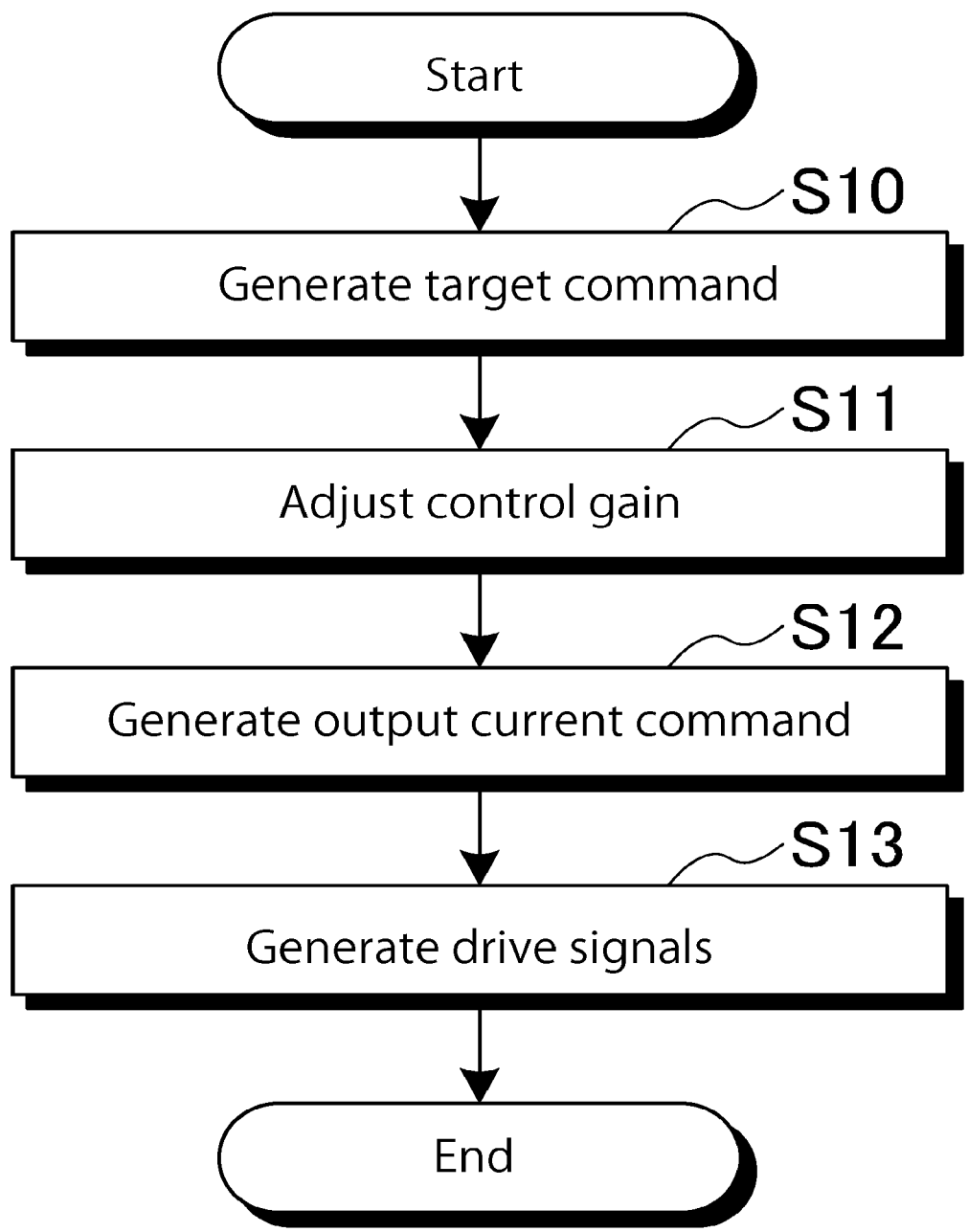
FIG. 11 is a flowchart of control processing performed by the controller.

FIG. 11 is a flowchart of control processing performed by the controller 20. The controller 20 starts the control processing illustrated in FIG. 11 at, for example, the start of the power conversion performed by the power converter 10, and repeats the control processing at predetermined time intervals.

As illustrated in FIG. 11, the controller 20 generates a target command in the mountain climbing processing and/or the mountain searching processing (step S10). The target command is the power-source voltage command Vin* or the power source current command Iin*. For example, the controller 20 generates a new power-source voltage command Vin* when the supplied voltage Vin matches the power-source voltage command Vin* generated in the mountain climbing processing and/or the mountain searching processing or after a predetermined period of time has passed since the generation of the power-source voltage command Vin*. For example, when the supplied voltage Vin is larger than the power-source voltage command Vin* by equal to or larger than a predetermined value, the controller 20 sets the supplied voltage Vin at the power-source voltage command Vin*.

Then, the controller 20 adjusts the control gain K (step S11). In this processing, the controller 20 obtains control gain K that is based on, for example, the supplied voltage Vin or the supplied current Iin, and sets the control gain K in the feedback controller 22.

Based on the control gain K adjusted at step S11, the controller 20 generates the output current command Iout*

(step S12). For example, the controller 20 performs PI control using the control gain K adjusted at step S11 to obtain the power source current command Iin*, and generates the output current command Iout* based on the power source current command Iin*.

Then, the controller 20 generates the drive signals S1 to S4, which are used to drive the power converter 10, based on the power source current command Iin* output from the command generator 52 (step S13).

Thus, the power conversion apparatus 1 improves maximum power point trackability by adjusting the control gain K based on the supplied voltage Vin or the supplied current Iin.

While in the above-described embodiment the power converter 10 converts DC power into AC power, the power converter 10 may convert the DC power of the power generation source 2 into DC power of a predetermined voltage. In this case, the power converter 10 is not provided with the inverter circuit 32, and the power conversion apparatus 1 is provided with a voltage detector that detects the value of the current output from the booster circuit 31. The controller 20 generates the drive signal S5 based on the output current of the booster circuit 31 and the output current command Iout*. Thus, the feedback controller 22 serves the function of the boost controller 25.

It should be noted that the arrows illustrated in the drawings, such as in FIG. 2, FIG. 6, FIG. 7, and FIG. 8, are provided to aid understanding of directions of flow of information (such as data and signals) or flow of control, and are not intended to exclude other flows or limit the directions of the flows.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A power conversion apparatus comprising:
   a power converter configured to convert supplied power supplied from a power generation source into second power;
   a target command controller configured to increase or decrease a target command so as to cause the supplied power to follow maximum suppliable power of the power generation source;
   a feedback controller configured to control the power converter by feedback control that is based on a deviation between the target command and at least one of a supplied voltage and a supplied current supplied from the power generation source to the power converter; and
   a gain adjustor configured to adjust a gain of the feedback control based on at least one of the supplied voltage, the supplied current, and the target command, wherein
   the target command controller is configured to, when determining that the supplied power has reached a maximum point, output to the feedback controller a non-following target command that does not follow a change in the supplied power, instead of outputting the target command to maximize the supplied power.

2. The power conversion apparatus according to claim 1, wherein the gain adjustor is configured to adjust the gain of the feedback control based on at least one of an equation and a table that correlate the gain of the feedback control with at least one of the supplied voltage, the supplied current, and the target command.

3. The power conversion apparatus according to claim 1, wherein the gain of the feedback control comprises
   a first gain at a time when the supplied voltage is higher, and
   a second gain at a time when the supplied voltage is lower, and
   wherein the gain adjustor is configured to make the first gain larger than the second gain.

4. The power conversion apparatus according to claim 1, wherein the gain of the feedback control comprises
   a third gain at a time when the supplied current is higher, and
   a fourth gain at a time when the supplied current is lower, and
   wherein the gain adjustor is configured to make the third gain larger than the fourth gain.

5. The power conversion apparatus according to claim 1, wherein the gain adjustor is configured to make the gain of the feedback control larger as the supplied voltage becomes higher or the supplied current becomes lower.

6. The power conversion apparatus according to claim 5, wherein the power generation source comprises a solar cell, and
   wherein the gain adjustor is configured to adjust the gain of the feedback control based on an amount of solar radiation to the solar cell.

7. The power conversion apparatus according to claim 1, wherein the gain adjustor is configured to set a first control gain for a part of the feedback control that is before the supplied voltage or the supplied current becomes a voltage or a current corresponding to the maximum suppliable power,
   wherein the gain adjustor is configured to set a second control gain for another part of the feedback control that is after the supplied voltage or the supplied current has become the voltage or the current corresponding to the maximum suppliable power, and
   wherein the gain adjustor is configured to make the first control gain larger than the second control gain.

8. The power conversion apparatus according to claim 1, wherein the feedback controller comprises
   a command generator configured to perform at least one of P control, PI control, PID control, and PD control with respect to a difference between the target command and at least one of the supplied current and the supplied voltage, and
   a drive controller configured to generate, based on an output from the command generator, a drive signal to drive the power converter,
   wherein the gain of the feedback control comprises at least one of a proportional gain, a proportional integration gain, a proportional integration differentiation gain, and a proportional differentiation gain of the command generator.

9. The power conversion apparatus according to claim 1, wherein the feedback controller is configured to control an output of the power converter based on a power command that is based on a power supply characteristic of the power generation source.

10. The power conversion apparatus according to claim 9, wherein the target command generated by the target command controller comprises a voltage command, and
    wherein the feedback controller comprises
    a command generator configured to generate a current command based on the supplied voltage and the voltage command, a power command generator configured to generate the power command based on the current command or the supplied current and based on the voltage command or the supplied voltage,
an output current command generator configured to generate an output current command based on the power command, and
a drive signal generator configured to generate, based on the output command, a drive signal to drive the power converter.

11. The power conversion apparatus according to claim 9, wherein the target command generated by the target command controller comprises a current command, and wherein the feedback controller comprises
a command generator configured to generate a voltage command based on the supplied current and the current command,
a power command generator configured to generate the power command based on the voltage command or the supplied voltage and based on the current command or the supplied current,
an output command generator configured to generate an output current command based on the power command, and
a drive signal generator configured to generate, based on the output current command, a drive signal to drive the power converter.

12. The power conversion apparatus according to claim 1, further comprising a deviation determiner configured to determine whether at least one of the supplied voltage and the supplied current is larger than the target command by a predetermined value,
wherein when the deviation determiner has determined that at least one of the supplied voltage and the supplied current is larger than the target command by the predetermined value, the target command controller is configured to set the target command at a value that is based on at least one of the supplied voltage and the supplied current.

13. The power conversion apparatus according to claim 1, wherein the target command controller comprises
a first target command controller configured to output the target command to maximize the supplied power,
a second target command controller configured to output a non-following target command that does not follow the change in the supplied power,
a first determiner configured to determine whether the supplied power has reached the maximum point,
an output switch configured to, when the first determiner has determined that the supplied power has reached the maximum point, output to the feedback controller the non-following target command of the second target command controller instead of the target command of the first target command controller, and
a second determiner configured to determine whether the supplied power is larger when the non-following target command of the second target command controller is output to the feedback controller than the supplied power determined by the first determiner to have reached the maximum point.

14. The power conversion apparatus according to claim 13,
wherein after the output switch has output the non-following target command of the second target command controller to the feedback controller, the output switch is configured to resume outputting the target command of the first target command controller to the feedback controller, and
wherein when the second determiner has determined that the supplied power is larger when the non-following target command of the second target command controller is output to the feedback controller than the supplied power determined by the first determiner to have reached the maximum point, the first target command controller is configured to make the resumed target command a command that is based on the non-following target command of the second target command controller.

15. The power conversion apparatus according to claim 1, wherein the target command controller includes an output switch and is connected to the feedback controller via the output switch, the output switch outputting to the feedback controller the non-following target command instead of outputting the target command, when determining that the supplied power has reached the maximum point.

16. A power generation system comprising:
a power generation source; and
a power conversion apparatus comprising:
a power converter configured to convert supplied power supplied from the power generation source into second power,
a target command controller configured to increase or decrease a target command so as to cause the supplied power to follow maximum suppliable power of the power generation source,
a feedback controller configured to control the power converter by feedback control that is based on a deviation between the target command and at least one of a supplied voltage and a supplied current supplied from the power generation source to the power converter, and
a gain adjustor configured to adjust a gain of the feedback control based on at least one of the supplied voltage, the supplied current, and the target command, wherein
the target command controller is configured to, when determining that the supplied power has reached a maximum point, output to the feedback controller a non-following target command that does not follow a change in the supplied power, instead of outputting the target command to maximize the supplied power.

17. A controller comprising:
a target command controller configured to increase or decrease a target command so as to cause supplied power supplied from a power generation source to a power converter to follow maximum suppliable power of the power generation source;
a feedback controller configured to control the power converter by feedback control that is based on a deviation between the target command and at least one of a supplied voltage and a supplied current supplied from the power generation source to the power converter; and
a gain adjustor configured to adjust a gain of the feedback control based on at least one of the supplied voltage, the supplied current, and the target command, wherein
the target command controller is configured to, when determining that the supplied power has reached a maximum point, output to the feedback controller a non-following target command that does not follow a change in the supplied power, instead of outputting the target command to maximize the supplied power.

18. A method for performing control, the method comprising:
- increasing or decreasing a target command so as to cause supplied power supplied from a power generation source to a power converter to follow maximum suppliable power of the power generation source;
- controlling the power converter by feedback control that is based on a deviation between the target command and at least one of a supplied voltage and a supplied current supplied from the power generation source to the power converter;
- adjusting a gain of the feedback control based on at least one of the supplied voltage, the supplied current, and the target command; and
- when determining that the supplied power has reached a maximum point, outputting a non-following target command that does not follow a change in the supplied power, instead of outputting the target command to maximize the supplied power.

* * * * *